R. N. McCLURE.
DIRECTION INDICATOR.
APPLICATION FILED JUNE 11, 1919.
1,366,400.
Patented Jan. 25, 1921.
2 SHEETS—SHEET 2.
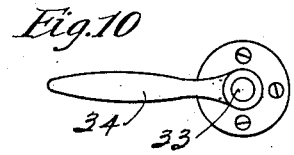
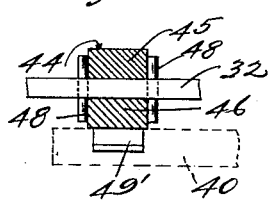
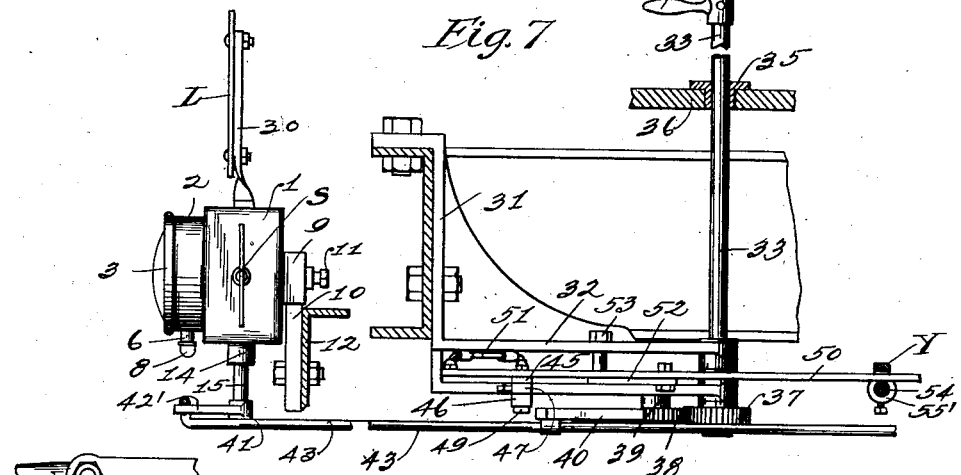
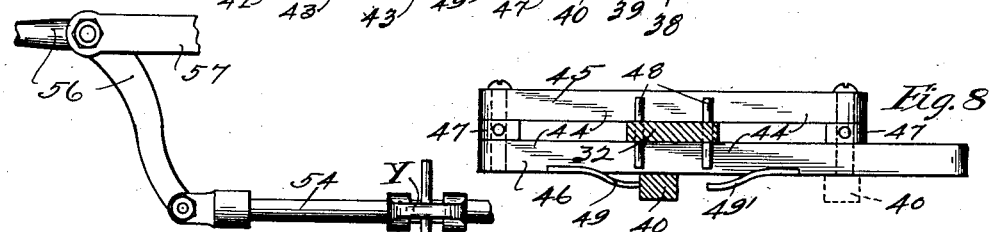
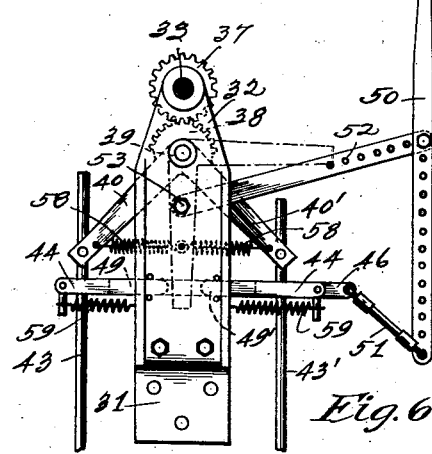
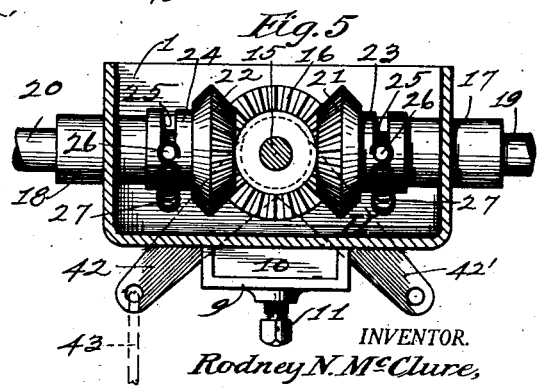
INVENTOR.
Rodney N. McClure,
BY
ATTORNEY.

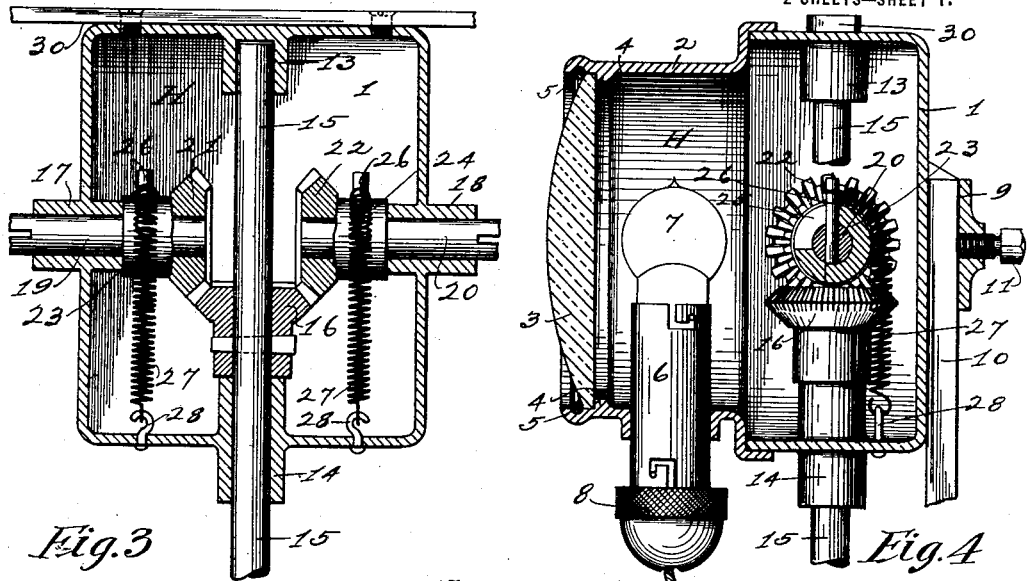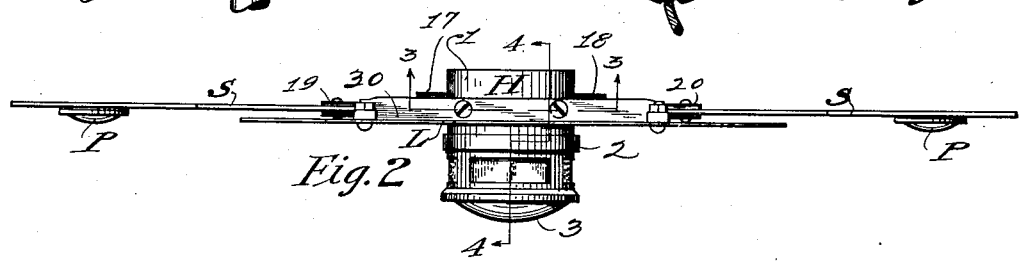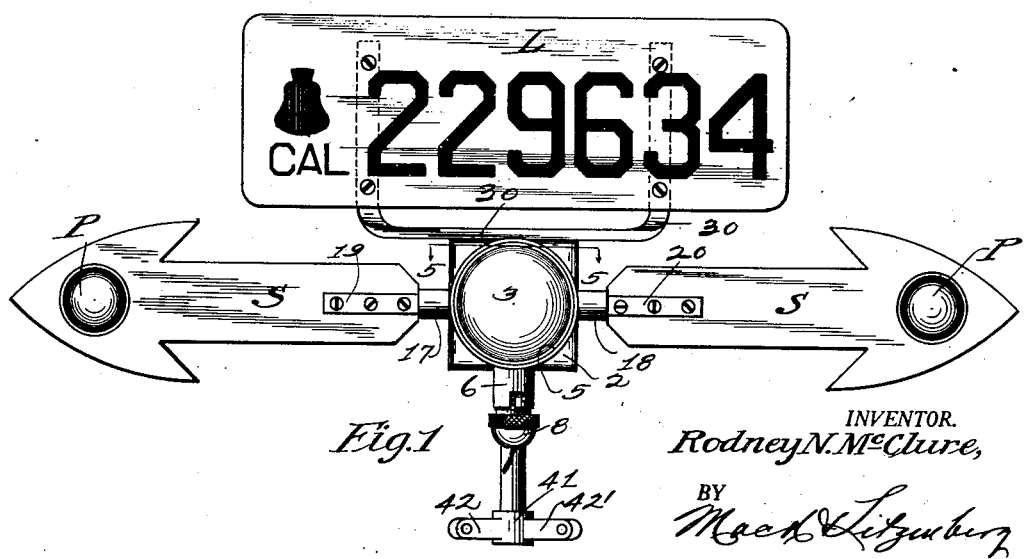

UNITED STATES PATENT OFFICE.

RODNEY N. McCLURE, OF LOS ANGELES, CALIFORNIA.

DIRECTION-INDICATOR.

1,366,400.   Specification of Letters Patent.   Patented Jan. 25, 1921.

Application filed June 11, 1919. Serial No. 304,715.

*To all whom it may concern:*

Be it known that I, RODNEY N. McCLURE, a citizen of the United States, and a resident of Los Angeles, in the county of Los Angeles and State of California, have invented new and useful Improvements in Direction-Indicators, of which the following is a specification.

This invention relates to and has for a principal object the provision of means attachable to an automobile or other type of vehicle for indicating to persons in front and behind the contemplated change of direction of a vehicle.

An object, also, is to provide a mechanism of the character referred to in which a structure is employed which is simple, effective and as free as possible from complications, said mechanism being designed for attachment at the front and rear of a vehicle, preferably to the running gear, and connected with the steering mechanism of the vehicle in such a manner that the direction indicators may be manually set prior to the operation of the steering mechanism and restored automatically when said steering mechanism is restored to normal position.

Another object is to provide an improved form of signal device in which is combined the license number display, a danger light and the direction signals, all of which elements are adapted to be supported in compact form, and said direction signals being adapted for operation by the driver of the vehicle, at will.

Other objects will appear as the description progresses.

I have illustrated one practical embodiment of my invention in the drawings hereto annexed and forming a part of this application, in which similar characters of reference are employed for indicating the same and like parts.

In said drawings:

Figure 1 is a front elevation of one of my improved signal devices, or direction indicators, Fig. 2 is a plan of the same, Fig. 3 is a section of the same on line 3—3 of Fig. 2, Fig. 4 is a section of the same on line 4—4 of Fig. 2, Fig. 5 is a sectional plan of a portion of the direction indicating means on line 5—5, Fig. 1, Fig. 6 is a plan of the operating mechanism for the direction signals shown in connection with the steering cross rod of an automobile, Fig. 7 is an elevation of the same together with one of the signals attached to the frame of an automobile, Fig. 8 is an enlarged view of the operating slide shown in Fig. 6, Fig. 9 is a transverse section of the same, Fig. 10 is a plan of the operating lever and rod.

The signals S, one of which may be attached to the front end and one to the rear end of an automobile or vehicle, include separable housings composed of back portions 1 and front portions 2 which overlap the back portions and may be attached thereto in any suitable manner. The front portions 2 are preferably cylindrical in form and are adapted to support a lens 3 in the front open end thereof held between a stationary annular rib and a removable wire 5, as in the usual tail lamp housing.

A socket 6 is held in the bottom of the housing member 2 in which a lamp 7 may be held within the housing and a plug 8 may be attached to the exterior end of said socket, as shown in Fig. 4, for illuminating the interior of the housing.

The housing member 1 has a channeled lug 9 formed on or attached to the rear side thereof in which a bracket 10, may be inserted and held by means of a set screw 11, said bracket being attached at the other extremity to a convenient portion 12 of the running gear frame, as shown in Fig. 7.

The top and bottom of the housing member, I have bosses 13 and 14 formed thereon, respectively, which are bored to receive a vertical shaft 15, as shown in Fig. 3, and said shaft has a bevel gear 16 held thereon adjacent to the lower boss, or bearing 14. The opposite sides of the housing member, I have bosses 17 and 18 formed thereon in which are revolubly held horizontal shafts 19 and 20, respectively. Exterior of the housing H, the shafts 19 and 20 are provided with the signal vanes S, S, of any suitable form and size, there being thus one of said vanes on each side of the housing H. Vanes S, S, may be provided with illuminated lenses or prisms as shown at P, P, and suitably held on the vanes by means of which the vanes will be indicated at night; or in the darkness either by direct illumination from behind the lenses, if such are used, or by indirect reflection of lights upon the prisms. Interior of the housing H, the shafts 19, and 20 are provided with bevel gears 21 and 22, respectively, which mesh with opposite portions of the central gear 16 on shaft 15.

The hubs 23 and 24, respectively of gears 21 and 22 have segmental slots 25, 25, formed therein and pins 26, 26, are secured to the horizontal shafts 19 and 20 and extend through the slots 25, 25, and substantially outward from the peripheries of the hubs, the length of the arcuate slots being about 90 degrees and thus providing a movement of shafts 19 and 20 independently of the gears thereon. It will be noted that the slots in both of the gears are on the same side of the axis of the shafts 19 and 20 and that when the vertical shaft 15 is turned in a given direction, gears 21 and 22 will be turned correspondingly in opposite directions by means of their engagement with gear 16. Springs 27, 27, are attached at their upper ends to the pins 26, 26, in shafts 19 and 20, and at their lower ends said springs may be attached by eye screws 28, 28, to the bottom of the housing, and thus serve to normally hold the pins 26, 26, in corresponding ends of the slots 25, 25, in gears 21 and 22, as shown in Figs. 3 and 4. Now, it will be obvious that when gear 26 on shaft 15 moves in a clockwise direction, that gear 21 will move in an anti-clockwise direction and the pin 26 in shaft 19 being at the upper end of the slot 26, the shaft 19 will be moved as the gear is moved and correspondingly and the signal vane V exterior of the housing H will be turned a quarter of a revolution, or to correspond to the movement of the operating shaft 15.

The aforesaid movement of gears 16 and 21 occasions a reverse movement of gear 22 on shaft 20, the pin 26 in slot 25 moving in said slot so as to permit the turning of the gear 22 on the shaft 20 instead of with it as in the case of gear 21. The vane V, on shaft 20 is thus held stationary during the movement of the other vane. The operation of shaft 15 in a reverse direction will reverse the operation of the signal vanes, so that the vane on shaft 20 will be actuated while that on shaft 19 will remain stationary. One of the signal vanes is for indicating a movement to the right, and the other for indicating a movement to the left and the vanes are adapted to be normally held feathered with respect to the line of vision from in front and behind a vehicle. When the operating mechanism hereinbefore and hereinafter described is released, the springs 27, 27, will serve to automatically restore the signal mechanism to normal position for a succeeding operation.

It will be observed from the drawing that a license number plate L, may be conveniently attached to and supported on the top of the housing H, by means of a bracket 30, either formed integral with or attached to the housing H, and the device as thus constituted and clearly shown in Fig. 1, provides a sightly and convenient combination of license plate, tail or danger lamp and direction indicators, which may be easily and quickly attached to and detached from an automobile.

In Figs. 6 to 10, inclusive, I have shown a method of operating the signals which is semi-automatic in character. Other types of direction indicators have employed means for directly associating the signals with the steering wheel of the vehicle so that a movement of the steering mechanism will effect a corresponding movement of the signals. This is undesirable for the reason that a signal should be given a movement prior to the change in direction of the car. However, it is desirable to have the signals restored promptly with the restoring of the steering mechanism, and to this end I have provided means for manually operating the signals prior to a change in direction and automatic means for restoring said signals with the restoration of the steering wheel.

At a convenient point on the running gear of the vehicle and adapted to be attached to the frame F thereof, I provide a bracket 31 having horizontal arms 32, in which is revolubly supported operating shaft 33 which may be vertically disposed as shown in Fig. 7, or inclined to correspond with the steering wheel, if desirable. This operating shaft may be provided with a handle 34 at the top, and a bushing or bearing 35 in the floor 36 of the vehicle and on the lower end of the shaft, I provide a gear 37 which is adapted to mesh with a sector 38 on a bell crank 39, which is also pivotally supported on the lower side of the lower bracket arm 32, and has right angularly disposed arms 40 and 40' formed thereon.

The lower ends of the operating shafts 15 of the signals S, have bell cranks 41 thereon which also have right angularly disposed arms 42 and 42' thereon, and the arms 42, 42, of the signal bell cranks are adapted to be operatively connected with the arm 40 of the central bell crank 39 by means of a rod or cable 43. Similarly the arms 42', 42', of bell cranks 41, 41, are adapted to be connected with the arm 40' of the bell crank 39, by means of a rod or cable 43'. Thus when the operating shaft 33 is turned, motion is communicated to the bell crank 39 through gear 37 and sector 38, and the shafts 15, 15, of the signals are operated through the rod or cable connections 43 and 43' to a corresponding extent. The elements and devices described provide a manually operable system which is effective but not self restoring and may be used to advantage where a more comprehensive system is not needed.

In order that the mechanism may be made automatically restorable, I have provided on the arm 32 of the bracket 31, a horizontal slide 44 which comprises a pair of parallel bars 45 and 46 and spacers 47 at the ends suitably held together by screws, or otherwise. The bars 45 and 46 are slidably held on opposite sides of the arm 33 and operate in a transverse plane and are guided by means of pins 48, 48 in the said arm. The lower side of the bar 46 has a pair of spaced flat springs 49 and 49′ suitably attached thereto and preferably flush therewith at one end and bent so as to extend outwardly therefrom at their adjacent ends, a substantial gap being provided between the inner ends of said springs.

A line drawn through the center of the slide 44 will form the chord of the arc of movement of the arms 40 and 40′ of bell crank 39 and the position of said bell crank is such that the upper sides of the outer ends of arms 40 and 40′ will just clear the lower side of bar 46 of the slide 44. Thus the bell crank 39 may be moved so that the arms 40 and 40′ will occupy positions indicated in Fig. 6, one of said arms during the movement into such a position having moved over and depressed the spring 49 until the gap between the springs had been reached whereupon the spring restored. Now, a succeeding movement of the slide, it will be apparent, from right to left in Fig. 6, will cause the engagement of the arm 40 by the spring 49′ until the arm passes from between the springs and the bell crank will thus be restored.

Slide 44 is pivotally connected with a lever 50 by means of a link 51; the central portion of said lever is pivotally held on one end of a bar 52 which is supported at its inner end between arms 32 of the bracket 31, and is adapted to be adjustably but stationarily held by means of a bolt 53. The front end of lever 50 is loosely held on the steering cross rod 54, which is common to all automobiles, between portions 55 and 55′ of a yoke Y, and the rod 54 is connected with the steering knuckle 56 and front axle 57 in the usual manner.

It will be understood that with the signals in normal positions, the movement of the steering mechanism including rod 54, although serving to move the slide 44 over bracket 31, will not affect in any way the operation of said signals, for the signals must be first manually operated for displaying a desired signal to the oncoming traffic before the restoring mechanism will be effective.

Assuming Fig. 6 shows the normal positions of the operating elements, and that the signals have been turned so as to move the bell crank 39 into the position shown in broken lines in Fig. 6, one of the arms of said bell crank being intermediate of the springs 49 and 49′, a movement in either direction of the steering mechanism will further move and restore the bell crank. In the one case, the arms of the bell crank may at times, regardless of the position of the slide 44, either pass over the springs 49 or 49′, or enter the gap therebetween, while in the other event, the bell crank being stationary, the slide may move over or pass by the bell crank, regardless of its position. Thus an independence of action is provided which is elastic and yieldable. Neutralizing springs 58, 58, may be provided between the arms 40 and 40′ of the bell crank 39, and the central bracket arm 33, respectively, and similar springs 59, 59, may be provided for neutralizing the action of the slide 44.

Lever 50, link 51 and bar 52 are adjustable as to their connections, as indicated so that the proper leverage may be provided for accommodating the device to any make or type of automobile running gear.

I believe it to be possible to alter and modify the form of device shown, particularly the restoring mechanism, within the scope of the appended claims, without departing from the spirit of my invention.

What I claim is:

1. A direction indicator comprising a housing having a lamp therein and a transparent element in front of said lamp, an operating shaft journaled in said housing, indicators held on the exterior of said housing and having separate spindles extended thereinto, gearing connecting said operating shaft with said spindles, means being provided on each of said spindles for permitting the differential rotation of said spindles, and resilient means connecting said spindles with said housing for restoring said indicators.

2. A direction indicator having a housing, an operating shaft pivotally mounted therein, a gear thereon, a pair of spaced shafts disposed at an angle thereto and having signals thereon, means connected at opposite extremities to said case and said spaced shafts for yieldably holding said shafts in normal positions, and gears on said shafts meshing with the gear on said operating shaft and differentially connected with said shafts, whereby each of said signals may be independently operated.

3. A direction indicator having a housing, an operating shaft journaled therein and provided with a gear thereon, signal shafts also journaled therein at right angles to said operating shaft and having gears thereon meshing with the gear on said operating shaft, and springs held in tension between said signal shafts and said case for connecting signal shafts with the gears thereon, for independent operation in given directions.

4. In a direction indicator, a housing, an operating shaft journaled therein, signal shafts also journaled therein, gearing for operatively connecting said operating and signal shafts, pins transversely extended from said signal shafts and movable in slots in the gears thereon, and springs held in tension between said pins and a portion of said housing, whereby said signal shafts may be operated independently for indicating different signals, the tension of said springs serving to restore said signals to normal position.

5. In a direction indicator having a housing, a plurality of signaling elements mounted thereon, an operating member for said signals, means for manually actuating said operating member and means adapted to be connected with the steering mechanism of an automobile for automatically restoring said signals to normal position, said means including connections between said manual operating means and said signal operating members, for the purpose described.

6. In a device of the character described, a set of direction signals, a bracket adapted to be supported on the frame of an automobile, a manually operable member supported on said bracket, a transverse steering tie rod, and automatic means for restoring said signals to normal position when the steering mechanism is restored, and including a member adjustably supported on said bracket and operatively connected with said tie rod.

7. In a device of the character described, direction indicating means, an operating member connected therewith, a main operating member supported on the running gear of the vehicle and adapted to be manually controlled, a steering mechanism including a transverse tie rod connecting the front wheels of the vehicle, and means connected with said main operating member and said signal operating members and adapted to be actuated by said tie rod for restoring said signals to normal position when the steering mechanism is restored.

Signed at Los Angeles, Los Angeles county, California, this 5th day of May, 1919.

RODNEY N. McCLURE.

In presence of—
  LUTHER L. MACK,
  H. M. BRUNDAGE.